Feb. 13, 1951   P. W. BENJAMIN   2,541,856
STANCHION
Filed Dec. 2, 1946   5 Sheets-Sheet 2
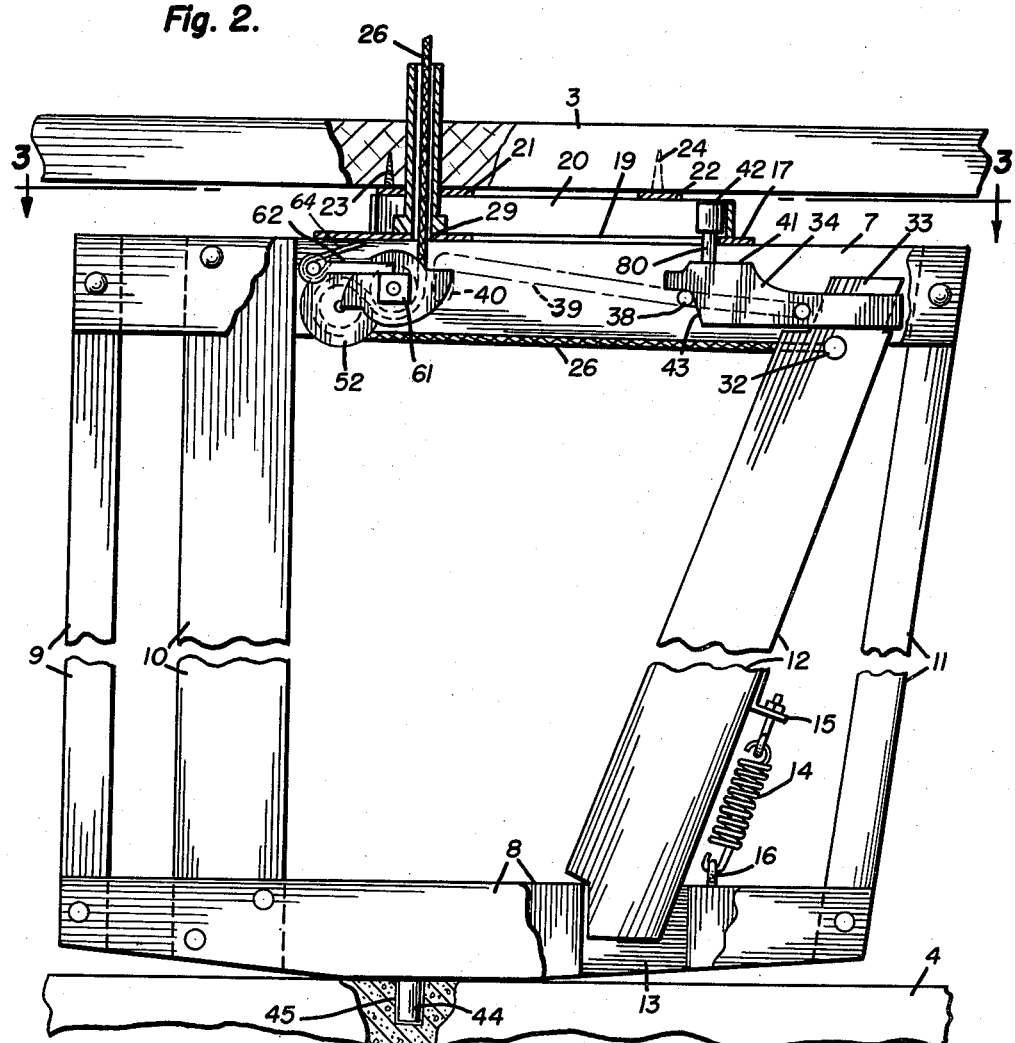
Fig. 2.
Fig. 3.
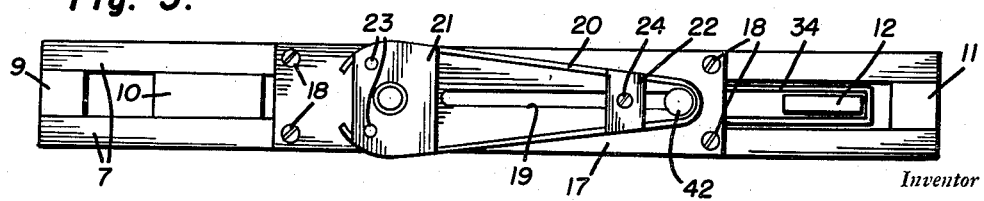
Inventor
Percy William Benjamin
By *Clarence A. O'Brien and Harvey B. Jacobson*
Attorneys Feb. 13, 1951 P. W. BENJAMIN 2,541,856
STANCHION
Filed Dec. 2, 1946 5 Sheets-Sheet 3

Inventor
Percy William Benjamin

By Clarence A. O'Brien
and Harvey B. Jacobson
Attorneys

Feb. 13, 1951 — P. W. BENJAMIN — 2,541,856
STANCHION
Filed Dec. 2, 1946 — 5 Sheets-Sheet 4
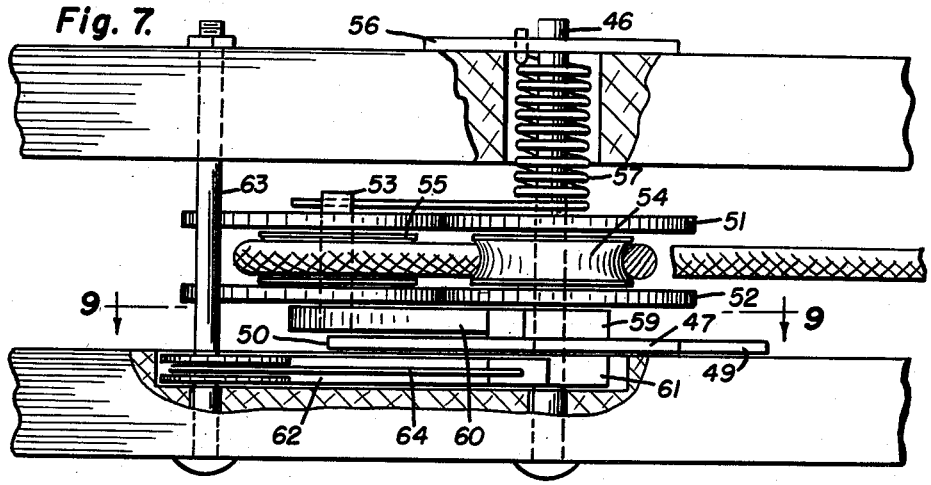
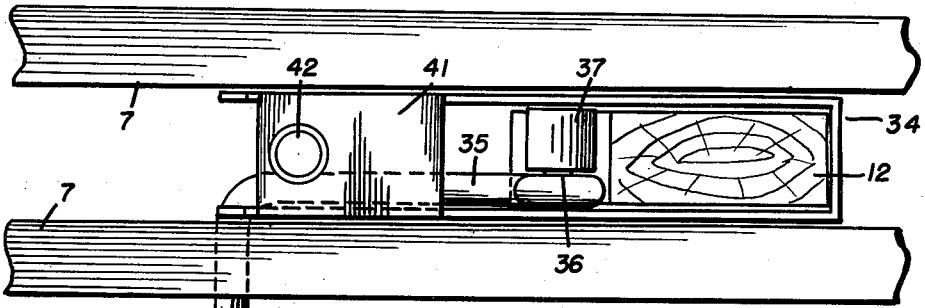
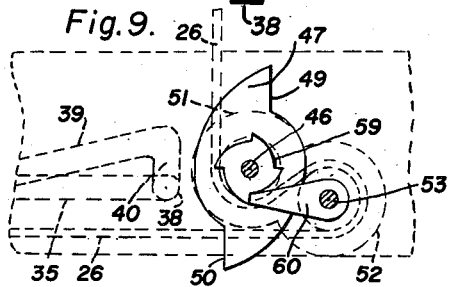
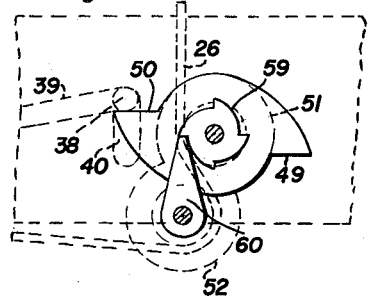
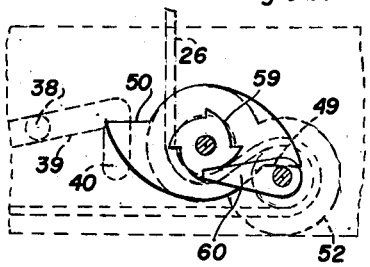
Inventor
Percy William Benjamin
By Clarence A. O'Brien
and Harvey B. Jacobson
Attorneys

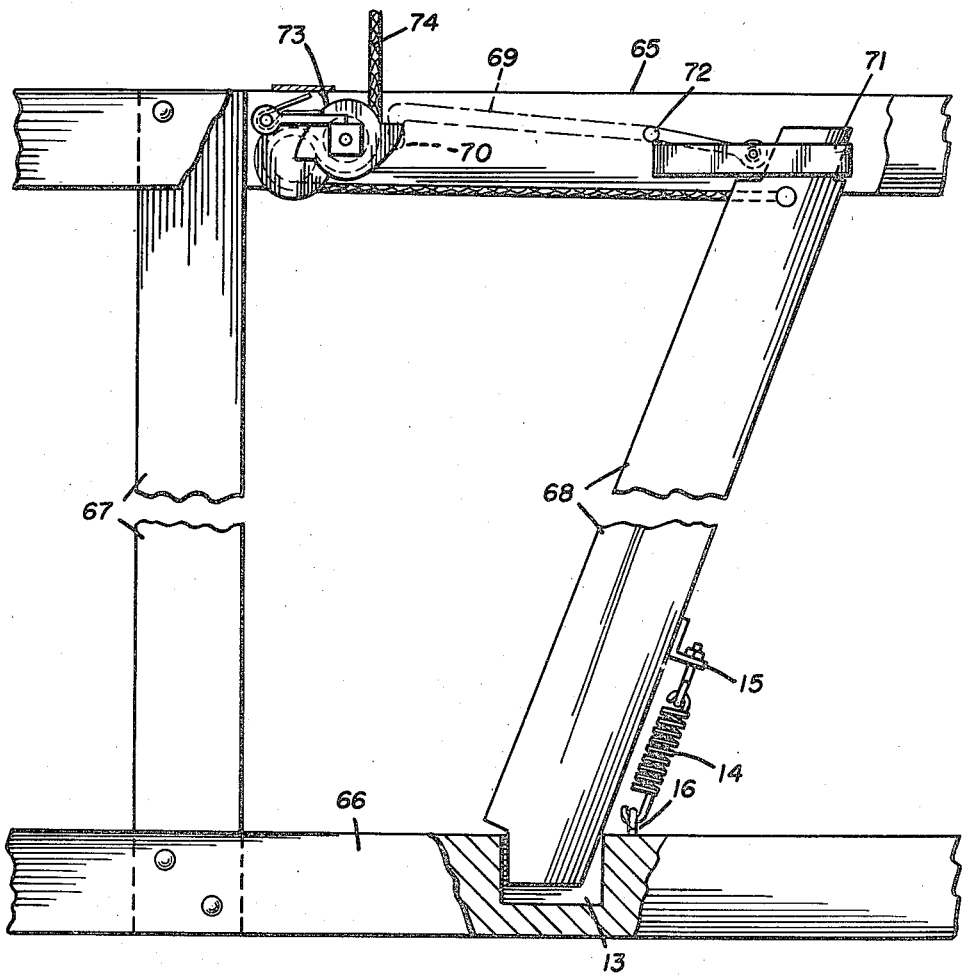

Patented Feb. 13, 1951

2,541,856

UNITED STATES PATENT OFFICE 2,541,856

STANCHION

Percy William Benjamin, Burlington Flats, N. Y.

Application December 2, 1946, Serial No. 713,539

6 Claims. (Cl. 119—147)

This invention relates to improvements in stanchions.

An object of the invention is to provide an improved stanchion construction which will include a frame and a movable stanchion side bar which will be operatively connected with remotely controlled means whereby said side bar may be selectively moved to closed position and locked, or may be released and moved to open position.

Another object of the invention is to provide an improved pivoted stanchion construction which will include a frame and a movable stanchion side bar which will be operatively connected with remotely controlled means whereby said side bar may be moved to closed position and said stanchion locked or the stanchion when in locked position may be released and said side bar automatically moved to open position.

A further object of the invention is to provide an improved form and construction of pivoted stanchion which will be held in fixed position when a pivoted side bar of the stanchion is open, but will be automatically released for pivotal movement when said pivoted side bar is moved to closed position.

Another object of the invention is to provide an improved cow stanchion which will be highly efficient in operation, and relatively inexpensive to manufacture and produce.

Other objects will appear as the description proceeds.

In the accompanying drawings which form a part of this application—

Figure 2 is a front elevation of the improved swivel stanchion, parts being broken away and shown partly in section with the stanchion locked in fixed position and the pivoted stanchion side bar open;

Figure 3 is a plan view of the stanchion taken on the line 3—3 of Figure 2;

Figure 7 is a plan view partly broken away and in section showing the stanchion latch locking and releasing mechanism;

Figure 8 is a plan view of a portion of the swivel stanchion showing the U-shaped latch supporting member disposed upon the upper end of the pivoted stanchion side bar;

Figure 9 is a diagrammatic view showing the position of the latch, plates, ratchet and pawl when the cable is finally released;

Figure 9A is a view similar to Figure 9 showing the position of the same members with the latch released when an initial pull is exerted on the cable;

Figure 9B is a view similar to Figure 9 showing the position of the same members when the cable is released after the initial pull; and Figure 10 is a front elevation of a second embodiment of the invention illustrating a fixed stanchion, with parts thereof being broken away and in section to show the operating mechanism therefor and pivoted stanchion side bar open.

Like characters of reference are used throughout the following specification and the accompanying drawings to designate corresponding parts.

Figure 1:
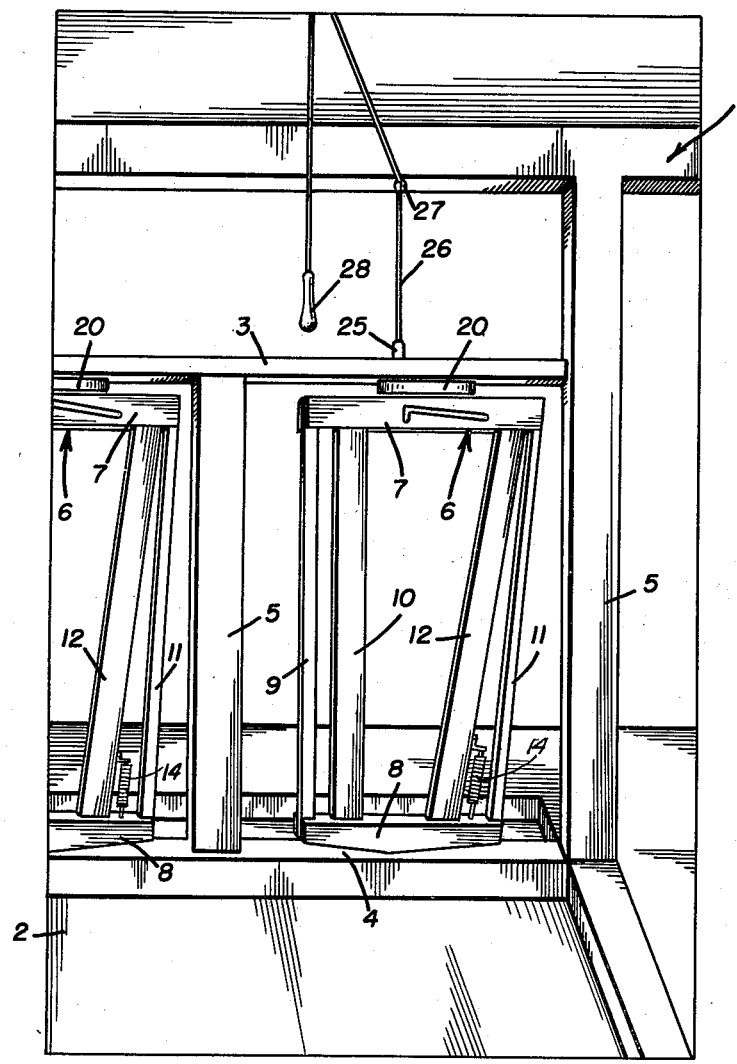
Figure 1 is a perspective view of a portion of a stable with the improved swivel stanchion shown in fixed position with the pivoted stanchion side bar open.

In carrying out the invention, there is provided and illustrated a stable generally denoted by the reference numeral 1 having a floor 2, a stanchion supporting top frame member or bar 3, a bottom frame member or bar 4, and vertically disposed spaced side frame members or bars 5.

A plurality of stanchions generally denoted by the reference numeral 6 are formed with spaced parallel transverse extending top frame members 7 and similarly formed spaced parallel transverse extending bottom frame members 8, the same being connected together by means of the vertical side bars 9, 10 and 11, and by means of the pivoted side bar 12, pivoted at its lower end in the bearing socket 13 between said bottom frame members 8, and resiliently urged to its open position by means of the coil spring 14 secured to the bracket 15 on said side bar 12 and at its opposite end to the eye 16 in the upper surface of said bottom frame members 8.

A guide plate 17 is secured by means of the screws 18 to the upper edges of the top frame members 7, and is formed with a longitudinally extending guide slot 19 for purposes hereinafter described.

A V-shaped keeper frame 20 of metal is provided with the cross webs 21 and 22 which are apertured to receive the screws 23 and 24 which extend into the under surface of the top frame member or bar 3, holding the same thereto in fixed position.

A vertical rope guiding tube 25 is secured to the guide plate 17 by welding or in any other desired manner, and extends upwardly through and above the top frame member or bar 3 for receiving and guiding the stanchion operating rope or cable 26 whose outer end passes over the pulley 27 and supports the handle member 28 on its depending end adjacent the outer end of the stall. The rope or cable 26 extends downwardly through the opening 29 in the guide plate 17 about the cooperating pulleys 54 and 55, being secured at its innermost end to a pin or fastener 32 in the upper end of the pivoted stanchion side bar 12.

The upper end of the pivoted stanchion side bar 12 is reduced at 33 to support the laterally extending U-shape latch supporting frame 34. The latch 35 is pivotally supported on a pin 36 on the bracket 37 and extends forwardly as at 38 at its outer end, said end 38 extending through the inclined slot 39 in one of the top frame members 7. The upper end of the slot 39 terminates in the depending vertical portion 40 in which the latch end 38 is received when the pivoted stanchion side bar 12 is closed and locked.

A transverse web 41 is connected between the inner ends of the U-shape latch supporting frame 34, supporting the upwardly extending shank or rod 80 which extends through the guide slot 19 in the guide plate 17, and terminates with the enlarged round bearing head 42 which is disposed between the sides of the keeper frame 20, being positioned in the narrow end thereof when the pivoted stanchion side bar 12 is opened to prevent movement of the stanchion. When the side bar 12 is moved inwardly by pulling down on the operating rope or cable 26 and handle 28, the angulated front nose 43 of the latch supporting frame 34 will force the end 38 of the latch 35 inwardly and upwardly until said end drops into the vertical portion 40 of the guide slot 39, thereby locking the side bar 12 in closed position and simultaneously permitting the stanchion to swivel on the rope or cable guide tube 25 and the pivot pin 44 secured to the bottom frame member 8 supported for rotation in the bearing socket 45 in the upper surface of the bottom frame member or bar 4.

The actuating mechanism for locking and releasing the latch 35 includes a bearing shaft 46 extending between the spaced upper frame members 7 of the stanchion upon which the ratchet member 47 is mounted, being formed with the oppositely extending ratchet teeth 49 or 50 for alternately engaging the forwardly extending end 38 of the latch 35 for raising the same upwardly in the vertical portion 40 of the guide slot 39 when said ratchet member is rotated in a clockwise direction.

The spaced disk-shaped plates 51 and 52 are loosely mounted on the shaft 46 with the ratchet member 47 to cooperate therewith and move in an arc about said bearing shaft 46 when the rope or cable 26 is pulled upon. The pulleys 54 and 55 are loosely disposed respectively upon the shafts 46 and 53 between the disk-shaped members 51 and 52 respectively for engagement with the operating rope or cable 26 in the manner hereinbefore described.

A bearing plate 56 is secured to one of the upper frame members 7 and will support the inner end of the bearing shaft 46. One end of a coil tensioning spring 57 is secured to said plate 56 and extends about the shaft 46, having its opposite end extended laterally of and secured to the shaft 53.

The fourth tooth ratchet wheel 59 is loosely mounted on the shaft 46 and is welded or otherwise fastened to the ratchet member 47, and cooperates with the pawl 60 secured to the shaft 53 for a purpose to be later described.

A square nut 61 is secured on the shaft 46 and is engaged by the locking finger 62 pivotally supported on the bolt or shaft 63, being resiliently tensioned by means of the spring arm 64 disposed about the finger 62 and lying on the upper surface thereof.

The action of the latch operating mechanism hereinbefore described will be as follows.

Figure 4:
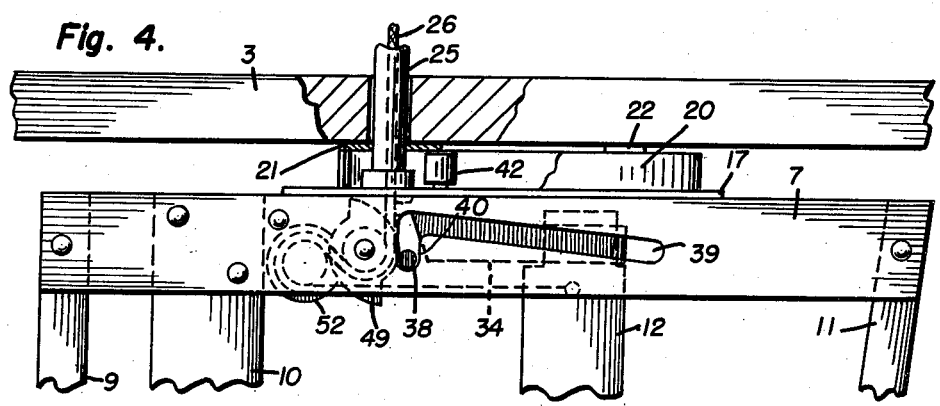
Figure 4 is a front elevation of the upper portion of the swivel stanchion, parts being broken away and partly in section showing the pivoted stanchion side bar closed and held in locked position.
Figure 5:
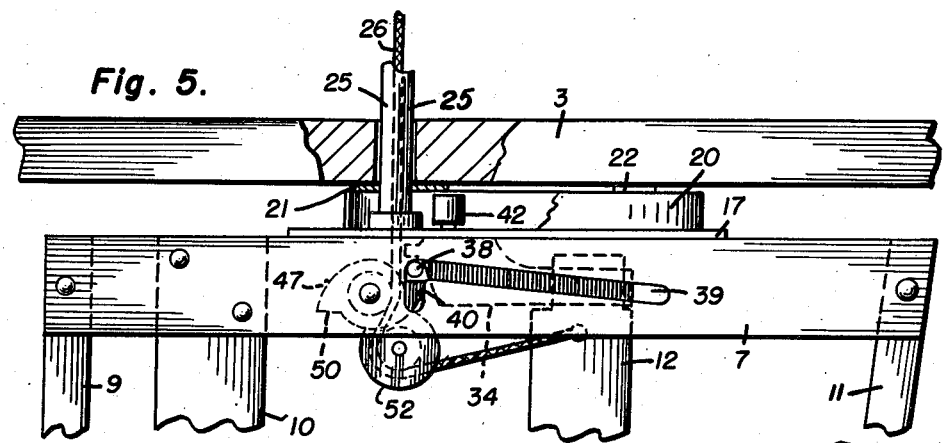
Figure 5 is a similar view to that of Figure 4, parts being broken away and partly in section but with the lock or latch about to be released to automatically open the stanchion side bar.
Figure 6:
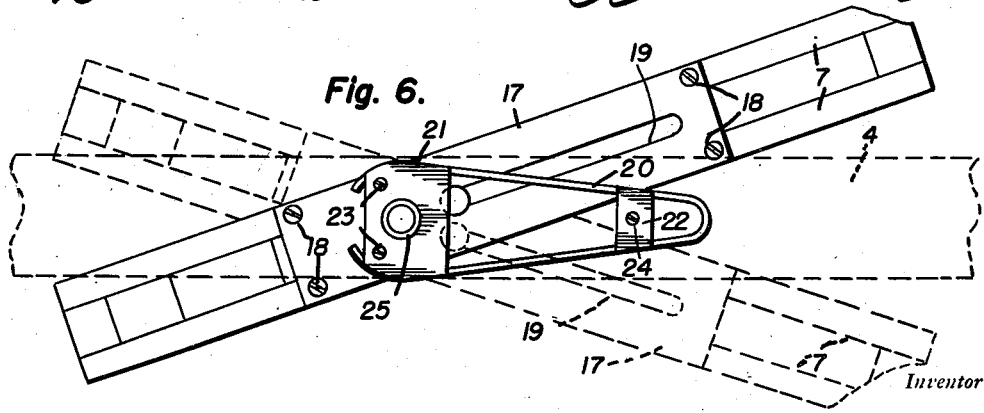
Figure 6 is a similar view to that shown in Figure 3, but showing the stanchion in dotted lines in different positions.

A pull is exerted on the rope or cable 26 and by virtue of its attachment to pivoted side bar 12, latch supporting frame 34 and latch 35 pivoted thereto are urged to the left in Figure 2 against action of the spring 14, the latch end 38 riding in the slot 39 until it reaches the vertical portion 40, dropping therein by gravity and locking said side bar 12. The pull or tension on the cable 26 in the meantime has pivoted plates 51 and 52 from a horizontal to a vertical position about shaft 46 against the action of the spring 57. At the same time, the pawl 60 rotatably engages the ratchet 59 to urge the ratchet member 47 from the position shown in Figure 9B to the position shown in Figure 9. Subsequent release of the cable 26 allows the plates 51 and 52 to assume a horizontal position as shown in Figure 9 by virtue of the expansion of spring 57. It will be understood that the locking finger 62, bearing against the nut 61 on the shaft 46 by means of spring arm 64, urges the ratchet member 47 into positive engagement with the pawl 60. Thus, the side bar 12 is actuated into a locked position, Figures 4 and 9, by a pull and release of the cable 26.

To release or unlock side bar 12, a pull is exerted on cable 26 whereby plates 51 and 52, ratchets 47 and 59, and pawl 60 assume the position shown in Figure 9A. As will readily be seen, the tooth 50 engages the latch end 38 urging the latter upwardly in the vertical portion 40. When the latch end 38 clears the vertical portion, the spring 14 pulls the latch 35 and the side bar 12 back to the right on Figure 2 to an unlocked position. Upon further release of the cable 26, plates 51 and 52 assume the horizontal position in Figure 9B. This completes an entire locking and unlocking cycle of operation. Obviously, the cycle may be repeated a number of times, it being understood that each locking and unlocking operation requires a pull and release of the cable 26.

In Figure 10 of the drawings there is illustrated a fixed stanchion frame having upper frame members 65 and lower frame members 66, being connected by the fixed side bar 67 and pivoted side bar 68. A similarly formed upwardly extending guide slot 69 with vertical locking portion 70 is provided, and a U-shaped supporting frame 71 is provided for the latch 72 which is operable in said guide slot 69 and locking portion 70 thereof.

A similar latch locking and releasing mechanism generally denoted by the reference numeral 73 is provided, and is operable by the rope or cable 74 in a like manner as in the hereinbefore described mechanism for the swivelly mounted stanchion.

From the foregoing description, it will be seen that there has been provided a highly efficient form of cow stanchion for stables which will be manually operable for locking and releasing a pivoted side bar therefor from a remote position.

While the preferred embodiment of the instant invention has been illustrated and described, it will be understod that it is not intended to limit the scope of the invention thereto, as many minor changes in detail of construction may be resorted to without departure from the spirit of the invention.

Having thus described my invention, what I claim as new and desire to secure by Letters Patent of the United States is:

1. In combination with upper and lower stanchion supporting frame members; a stanchion frame swivelly supported between said frame members, a stanchion side bar pivoted to the lower portion of said stanchion frame, a latch member supported by said pivoted side bar, said stanchion frame being provided with a latch guiding slot terminating in a vertically extending locking portion, said latch member including a portion extending slidably into said slot provided in said stanchion frame, resilient means normally urging said side bar into an open position and said portion of said latch member away from said locking portion provided in said stanchion frame, a cable connected to said pivoted side bar for pulling the latter into a locked position, and a latch release mechanism operatively connected to said cable, said latch release mechanism comprising a shaft carried by said stanchion frame, a latch engaging ratchet rotatable on said shaft, a second ratchet secured to said latch engaging ratchet, a pawl engageable with said second ratchet, and means actuated by said cable for urging said pawl into engagement with said second ratchet.

2. The combination of claim 1, and resilient means normally urging said second ratchet towards said pawl.

3. The combination of claim 2, wherein said last-named means includes an abutment on said shaft, an arm pivoted to said stanchion frame, and resilient means normally urging said arm into bearing engagement with said abutment.

4. The combination of claim 1, wherein said means for urging said pawl into engagement with said second ratchet includes a first plate rotatably secured to said shaft, a second plate secured to said first plate, said pawl being carried by said second plate, cable engaging pulleys carried by said first and second plates, and resilient means normally urging said first and second plates upwardly and said pawl out of engagement with said second ratchet.

5. The combination of claim 4, and resilient means normally urging said second ratchet towards said pawl.

6. The combination of claim 5, wherein said last-named means includes an abutment on said shaft, an arm pivoted to said stanchion frame, and resilient means normally urging said arm into bearing engagement with said abutment.

PERCY WILLIAM BENJAMIN.

REFERENCES CITED

The following references are of record in the file of this patent:

UNITED STATES PATENTS

| Number | Name | Date |
|---|---|---|
| 642,647 | Thurston | Feb. 6, 1900 |
| 679,431 | Simons | July 30, 1901 |
| 1,184,197 | Mikan | May 23, 1916 |
| 1,395,882 | Webb | Nov. 1, 1921 |
| 1,464,159 | Troth | Aug. 7, 1923 |
| 1,547,011 | Anderson | July 21, 1925 |